US008700484B2

(12) United States Patent  (10) Patent No.: US 8,700,484 B2
Senior  (45) Date of Patent: Apr. 15, 2014

(54) ELECTRONIC QUANTITY PURCHASING SYSTEM

(76) Inventor: Rodney Senior, Ft. Myers, FL (US)

( * ) Notice: Subject to any disclaimer, the term of this patent is extended or adjusted under 35 U.S.C. 154(b) by 286 days.

(21) Appl. No.: 13/273,970

(22) Filed: Oct. 14, 2011

(65) Prior Publication Data

US 2012/0072329 A1  Mar. 22, 2012

Related U.S. Application Data

(63) Continuation of application No. 11/810,638, filed on Jun. 6, 2007, now Pat. No. 8,065,191, which is a continuation-in-part of application No. 09/805,950, filed on Mar. 15, 2001, now abandoned.

(60) Provisional application No. 60/189,472, filed on Mar. 15, 2000.

(51) Int. Cl.
  *G06Q 30/00* (2012.01)
(52) U.S. Cl.
  USPC .......................... 705/26.2; 705/14.39; 705/22
(58) Field of Classification Search
  USPC .............................. 705/26.2, 10, 35, 22, 14.39
  See application file for complete search history.

(56) References Cited

U.S. PATENT DOCUMENTS

| | | | |
|---|---|---|---|
| 5,710,887 A | 1/1998 | Chelliah et al. | |
| 5,890,137 A | 3/1999 | Koreeda | |
| 5,970,470 A | 10/1999 | Walker et al. | |
| 6,151,565 A | 11/2000 | Lobley et al. | |
| 6,193,155 B1 | 2/2001 | Walker et al. | |
| 6,321,984 B1 * | 11/2001 | McCall et al. | 235/381 |
| 6,526,277 B1 | 2/2003 | Zicker et al. | |
| 6,594,644 B1 | 7/2003 | Van Dusen | |
| 6,611,811 B1 | 8/2003 | Deaton et al. | |
| 6,741,969 B1 | 5/2004 | Chen et al. | |
| 6,754,636 B1 | 6/2004 | Walker et al. | |
| 6,778,967 B1 | 8/2004 | Nicholson | |
| 6,862,612 B1 | 3/2005 | Horn et al. | |
| 6,980,960 B2 * | 12/2005 | Hajdukiewicz et al. | 705/14.34 |
| 7,251,617 B1 | 7/2007 | Walker et al. | |
| 8,019,694 B2 * | 9/2011 | Fell et al. | 705/400 |
| 8,346,616 B2 * | 1/2013 | Hwang | 705/26.1 |

(Continued)

FOREIGN PATENT DOCUMENTS

JP  410111985 A  4/1998

OTHER PUBLICATIONS

Deierlein, Bob, Tracking fuel usage is vital:, Beverage world, dated Oct. 15, 1998.*

(Continued)

*Primary Examiner* — Mark Fadok
(74) *Attorney, Agent, or Firm* — Brown Rudnick LLP

(57) ABSTRACT

Disclosed is an electronic quantity purchasing system which is a host computer that a user may access to purchase quantities of goods or services at a locked-in price for later redemption. The preferred communication means employed is via secure, high-speed Internet access. Data storage is electronic. Users employ the system to make an instant purchase of a small or large quantity of a commodity, such as gasoline at the current purchase price. Users can redeem all or part of their balance for real product at a physical location in the future when desired. The redemption will draw down the user's account balance at the locked-in purchase price, so the user is able to circumvent the market price in effect at the time of redemption.

20 Claims, 11 Drawing Sheets

(56) References Cited

U.S. PATENT DOCUMENTS

| | | | |
|---|---|---|---|
| 8,478,683 B2* | 7/2013 | Kirch et al. | 705/37 |
| 2003/0033154 A1* | 2/2003 | Hajdukiewicz et al. | 705/1 |
| 2003/0197060 A1* | 10/2003 | Coyner | 235/381 |
| 2004/0177019 A1* | 9/2004 | Slavov et al. | 705/36 |
| 2004/0260632 A1* | 12/2004 | Wanasek | 705/30 |
| 2006/0015530 A1* | 1/2006 | Schlecht | 707/104.1 |
| 2007/0198385 A1* | 8/2007 | McGill et al. | 705/36 R |
| 2007/0203794 A1* | 8/2007 | Hajdukiewicz et al. | 705/14 |
| 2008/0313013 A1* | 12/2008 | Fell et al. | 705/10 |
| 2009/0327025 A1 | 12/2009 | Kirch et al. | |
| 2012/0278222 A1* | 11/2012 | Kirch et al. | 705/37 |

OTHER PUBLICATIONS

Wilner, Frank, "Good news on oil prices", Journal of Commerce, dated Sep. 28, 1998.*

D. Tommello, "Priceline.com plans to let customers set prices for gasoline," The Augusta Chronicle, Feb. 26, 2000.

P. Fusco, "Priceline.com adds gasoline to its lineup," Austin American Statesman, Austin TX, Feb. 26, 2000.

Dowd, Kevin, "The Mechanics of Indirect Convertibility", Journal of Money, Credit, and Banking, dated Feb. 1995.

* cited by examiner

FIG. 7

Esso Litre Bank - Protect Your Price - Microsoft Internet Explorer

Address: https://www.litrebank.com/go.asp?F=BUY1

*Welcome to*
*Esso Litre Bank*

My Balance Details

☐ EXTRA
New Brunswick ............ 50.000L
Ontario East .............. 70.000L
Total .................. 120.000L

☐ REGULAR
Manitoba .................. 9.833L
New Brunswick ............ 110.000L
Ontario East ............. 100.000L
Yukon .................... 67.168L
Total .................. 287.001L

☐ SUPREME
Manitoba ................. 63.695
Ontario South-West ....... 90.000
Total .................. 153.695

---

My Balance
Diesel      0.0 L
Extra       1.20 L
Regular   247.0 L
Supreme    64.0 L

BUY Litres
TRANSFER Litres
CONVERT Zone
Transaction HISTORY
My Balance DETAILS
STATION Locator
CHANGE Profile Home
Admin
Exit

FIG. 11

| Date | Description | Debits (Litres) | Credits (Litres) | Balance (Litres) |
|---|---|---|---|---|
| 05 Sep 2000 | Redeem @ 67.50¢ - 62 ESSA ROAD, BARRIE | 10.000 | | 130.000 |
| 01 Sep 2000 | Redeem @ 67.50¢ - 8 KINGSTON RD E & HARWOOD, AJAX | 10.000 | | 140.000 |
| 01 Sep 2000 | Purchase @ 66.30¢ | | 40.000 | 150.000 |
| 31 Aug 2000 | Purchase @ 66.30¢ | | 10.000 | 110.000 |
| 29 Aug 2000 | Transfer from GORD SMITH | | 20.000 | 100.000 |
| 28 Aug 2000 | Redeem @ 67.50¢ - 202 BAYLY ST E, AJAX | 10.000 | | 80.000 |
| 28 Aug 2000 | Transfer from GORD SMITH | | 10.000 | 90.000 |
| 16 Aug 2000 | Transfer from JENNY BROWN | | 20.000 | 80.000 |
| 16 Aug 2000 | Transfer from JENNY BROWN | | 40.000 | 60.000 |

My Balance
Diesel 10 L
Extra 37 L
Regular 320 L
Supreme 60 L

BUY Litres
TRANSFER Litres
CONVERT Zone
Transaction HISTORY
My Balance DETAILS
STATION Locator
CHANGE Profile Home
Admin
Exit

ELECTRONIC QUANTITY PURCHASING SYSTEM

CROSS-REFERENCE TO RELATED APPLICATIONS

This application is a continuation-in-part of U.S. patent application Ser. No. 09/805,950, filed Mar. 15, 2001, titled "Electronic Quantity Purchasing System," which claims priority to U.S. Provisional Patent Application No. 60/189,472, filed Mar. 15, 2000, the entirety of each being incorporated by reference herein.

FIELD OF THE INVENTION

This invention relates to purchasing systems for retail or business goods or services, and in particular to an electronic purchasing system that allows a user to purchase a quantity of a commodity at a current price, lock-in that price, and then take delivery, in whole or in part, at a later time.

BACKGROUND OF THE INVENTION

There are certain goods and services that consumers frequently purchase that fluctuate in price on a regular basis. These include fuel products; such as, gasoline, diesel, heating oil; food products; and a variety of services. Often the price fluctuations are most noted in commodity items of widespread consumption such as gasoline.

Traditionally, the oil and food industries have provided consumers with a variety of advanced cash deposit schemes to facilitate future purchases of commodities. Some examples are:

a) A prepaid gasoline card (e.g. Mobil, BP, Exxon, Citgo) where consumers pre-pay for a certain value of gasoline e.g. $25.00. This card usually acts as a gift certificate and is usually issued to family members, students or employees in the knowledge that it can be spent only on gasoline.

b) A fuel account at a service station where no credit terms have been agreed. An advanced cash deposit bond is usually required as security.

c) A supermarket Christmas savings club.

d) A pre-paid in-store deposit account providing supermarket customers with a means of controlling their shopping budget and avoid running up a credit bill.

In the above scenarios, when consumers spend their cash deposits on goods, they do so at a price in effect at the time of redemption. There is currently no method available that allows consumers to redeem at the price in effect at the time the cash payment was made. This is an important distinction because the price of the goods or services may have moved against the consumer in the meantime and the worth of the pre-paid monetary value deposit will have eroded.

Some purchasing systems have been introduced in certain industry segments in an effort to address some of these issues. Consumers are able to pre-purchase cellular air time in quantity terms not dollar terms. Many plans allow a user to buy a phone card with a certain number of minutes for a set price. Often this pre-purchased air time is in lieu of a monthly plan whereby the user commits to a set monthly fee with a fixed number of minutes being included in the fee. These plans are directed at occasional users or users with very low incomes who are not willing or able to purchase larger quantities or who require the lowest cost entry point. As a result, these plans are typically offered at higher per unit cost than traditional plans. Furthermore, as there is little price fluctuation in the price of these services (cellular air time) the plans are not designed to protect a consumer against price fluctuations by banking or storing the quantity for protection against price volatility.

Thus there is a need for a system which protects consumers' deposits against market price fluctuations and which makes it easy for consumers to pre-purchase fixed quantities of goods or services in advance. This need has heretofore not been met.

In addition to the area of consumer goods and services, there are many goods or services that businesses may wish to pre-purchase for later delivery, in whole or in part. An example of this is:

A fleet manager pre-purchases 5000 gallons of diesel for pick up by his individual truck drivers in 100 gallon quantities at truck stop locations over time. Once ordered, this 5000 gallon full tanker-load of diesel is physically deposited into any tank, with available tank capacity, within the designated truck stop network.

These will-call types of future pick-ups are usually accounted for in monetary value on agreed credit terms or against an advanced monetary down-payment. The physical product itself (diesel) has to be ordered and deposited into the underground tanks, which have a limited capacity. It is administratively cumbersome to pre-arrange for such types of purchases and requires a detailed audit trail, real time tank capacity, readings, and complex billing to handle this type of pre-purchase.

In the above example, there is a need for a system that allows the fleet manager to pre-purchase a 'full tanker-load' of diesel at the lowest 'full tanker-load' price, lock-in that price, and credit an account. At this point, no physical diesel has actually been delivered but a quantity is held on reserve that can be redeemed in part or in whole. This type of system would allow truck drivers to conveniently draw from a pre-paid reserve account in smaller fill-ups from any truck stop in a large network.

A feature of the system could include seamless integration to proprietary business accounting packages which do not readily provide the facility to hold accounts in quantity units where the pre-purchased units of goods or services are held on reserve.

In general, there is a need for a convenient system which allows both business and consumer purchasers to pre-purchase commodities in larger bulk quantities at discount prices, hold those quantities in a reserve account and redeem, in smaller quantity increments, at convenient points of distribution. In this way, businesses will save money by purchasing large quantities of goods or services at bulk prices whilst operating under the usual practical constraints of redeeming in smaller quantities over time.

There is also a need for businesses supplying many types of goods and services to offer additional means to establish or increase customer loyalty. Without systems to do so, purchasers faced with rapidly changing pricing with respect to standardized goods or services will often purchase from the vendor having the lowest price and will not tend to remain loyal to one brand vendor over another. This is particularly so when dealing with commodities such as gasoline.

OBJECTS OF THE INVENTION

In particular, an object of the invention is to create an electronic quantity purchasing system with which users may interface in order to purchase and transfer quantities of commodities and then redeem for real product at a future date, at designated locations, in the knowledge that the quantity of commodity so purchased is guaranteed against future market price fluctuations.

An example of this object is:

A consumer pre-purchases 100 gallons of gasoline when pump prices are considered low. The same consumer can redeem the 100 gallons in whole or in part at any one of a network of retail service stations, at a future time, when pump prices are higher. The consumer may also transfer the benefit of the 100 gallons in whole or in part to another user e.g. as a gift or as an expense control measure.

It is a further object of the invention to provide an interface design and interactive database software to allow consumers and businesses to create an online reserve account, purchase or redeem or transfer quantities of a commodity into and from that account via the electronic quantity purchasing system.

Another object of the invention is to allow users to pre-purchase bulk quantities of commodities at a discounted price and to redeem said quantities in smaller increments at retail locations over time.

It is a further object of the invention to provide businesses with the benefit of significant cost savings made by pre-purchasing in bulk whilst operating under the practical constraints of picking up real product in smaller increments at retail locations. Such constraints could include the size, shape and nature of the commodity or the capacity of the pick-up vehicle.

As an example:

A fleet manager pre-purchases 5000 gallons of diesel at a favorable 'road tank wagon-full load' price and deposits the 5000 gallons into his corporate gallon reserve account. The individual truck drivers fill up their vehicles in smaller 100 gallon increments at any convenient site within a national truck stop network that has access to the information stored in the electronic quantity purchasing system. The user's gallon reserve account is accessed and the gallon balance is debited online as the truck driver pumps diesel. The fleet manager benefits in three ways:

Purchases diesel at the lowest 'full road tanker' rate.

Protects the business against future price fluctuations in diesel.

Substitutes an otherwise convoluted fleet budgeting and accounting system with a simple electronic quantity purchasing system with integrated accounting functionality.

A further object of the invention is to provide an electronic quantity purchasing system to provide a mechanism for third party resellers to act as middlemen in the distribution of certain types of goods and services typically subject to price fluctuations. The middlemen could in effect act as bulk purchasers, in turn reselling to end users. This would provide advantages to both the user and the vendor.

SUMMARY OF THE INVENTION

The present invention relates to an electronic system and methods for purchasing quantities of goods or services in advance at current posted prices for later redemption for actual products or services at a distribution location.

An electronic quantity purchasing system is provided that allows users to carry out the pre-purchasing of small or large quantities of a specific good or services, such as gasoline, at a locked-in price, to credit their "reserve account."

The present invention also describes a method of allowing users to transfer all or a portion of their electronic quantity purchasing system account, or reserve account, to another user's account.

The present invention also describes a system that allows users to redeem from their reserve account in the future for actual products or services at an available point of distribution in order to hedge against future price fluctuations.

The present invention further describes a system that allows purchasers to take advantage of purchasing at bulk prices while preserving the practicality of picking product up at various locations in smaller increments over time.

In one embodiment, the present invention is directed to a method of transacting quantities of a commodity such as gasoline where users access an electronic quantity purchasing system. The method may include a number of features, such as maintaining a computer database system of commodity product information, identifying commodities transacted, identifying the posted value or unit price for each product for sale and displaying this value in the system catalog, providing each user with a unique secure access code to transact online commodities, branding each commodity for sale with corporate ID to promote the identity of the commodity seller, providing the user with designated actuation controls for instructing the system to instantly purchase the commodity at the posted price of the product, providing the user with designated actuation controls for instructing the system to instantly transfer online commodity to another user, carrying out the transaction by verifying all transaction details, obtaining and recording financial data for automated payment for the online commodity, updating the system database, and instantly reflecting the transaction in the user's account history, and providing the user with a redemption means via a unique identifier, e.g. a bar-coded keytag or magnetic striped & bar coded card, and/or special point-of-sale communications system in order for users to redeem their pre-purchased quantities of commodity at retail locations or other physical locations in the future.

According to a further aspect of the invention, the method includes creating an account for the user or potential user that can take place as part of a pre-registration process. In this way, the registration process can occur on-line or off-line.

According to a further aspect of the invention, the method includes the option of connecting the electronic quantity purchasing system directly to separate and distinct financial institutions for real-time credit approval before a purchase can take place. In this way, instant automated payment confirmation is carried out, as and when required.

According to one embodiment of the present invention, a system for transacting quantities of a commodity online is provided by a vendor for access by a user (purchaser), which system comprises at least one web server computer designed for serving a host of computer web browsers simultaneously and providing said browsers with the capability to interface with the system, where each browser can carry out a specified transaction of a specified commodity. The web server co-operates with a separate database computer, separated from the web server computer by a firewall. The database computer is accessible to the web computer to allow selective retrieval of commodity information which can include:

Product description

Quantity of product to be transacted

Current market and/or posted unit price of the commodity to be purchased (as the posted price on the electronic system may or may not be the same as what is considered the market trading price)

The web server computer can include custom written interface software for transacting commodities in the system database computer by displaying, during a transaction or at any other time, the current price of the commodity, providing a designated user actuation control for instructing the system to instantly purchase a commodity at the posted purchase price, continually updating the price, and continually updating all aspects of the system display as the user uses the interface to interact with the database.

The present invention resolves a complex administrative scheme that would otherwise arise in offering consumers and businesses a means of protecting against future price fluctuations of frequently purchased commodities. It also provides a simple and effective means of allowing purchasers to buy commodities at low bulk prices and then redeem, in whole or in part, at designated physical locations, at a later time.

BRIEF DESCRIPTION OF THE DRAWINGS

FIG. 7 is the display shown after actuating the control to view a detailed breakdown of the user's holdings in the system.

FIG. 11 is the display shown after actuating the control to view the user's entire account history, including all purchases, transfers and redemptions of the commodity or commodities, and details of each transaction. It is displayed in a similar fashion to a bank statement.

DETAILED DESCRIPTION OF THE PREFERRED EMBODIMENTS

The present invention relates to an electronic system and methods for purchasing quantities of commodities in advance at current prices for later redemption for physical products at a distribution or redemption location(s).

The purchasing system provides the user with a convenient method of making an advanced purchase of a small or large quantity of one or more commodities via the system at the price posted at the time of the purchase. Purchases are credited to the user's reserve account and stored electronically on a host computer. The quantity has been pre-purchased at a locked-in price, thus allowing the user to circumvent the market price in effect on the day of redemption. The system thus provides a convenient way for the user to hedge against future market price fluctuations of a commodity.

The system includes providing the user with a unique physical identifier e.g. bar-coded keytag or bar-coded and/or magnetic striped card. This identifier, combined with the Point of Sale and related internet-based system architecture and infrastructure, allows the user to redeem all or part of said quantity for real product at a retail location over time. Such a redemption will instantly draw down the user's reserve account balance.

The quantity purchasing system allows a user to transfer to another user some or all of the quantity of commodity purchased. The transferee now assumes ownership of the commodity and can redeem it in the future at retail locations for the quantity of commodity so transferred.

The electronic purchasing system allows users to pre-purchase bulk quantity reserves of commodities at a discounted bulk price and offers pre-purchasing of discrete quantities of specific branded products at the price posted on the system. The system then allows users to redeem real pre-purchased product at retail locations that are connected to the electronically stored information regarding the user. Their online account balance is then instantly debited.

The preferred communication means for the electronic quantity purchasing system is via the Internet thereby providing users with the ability to access their account at home, at work, at the point of purchase, or at any other Internet access location, including wireless access via handheld devices such as PDA's and cellphones.

Figure 1:
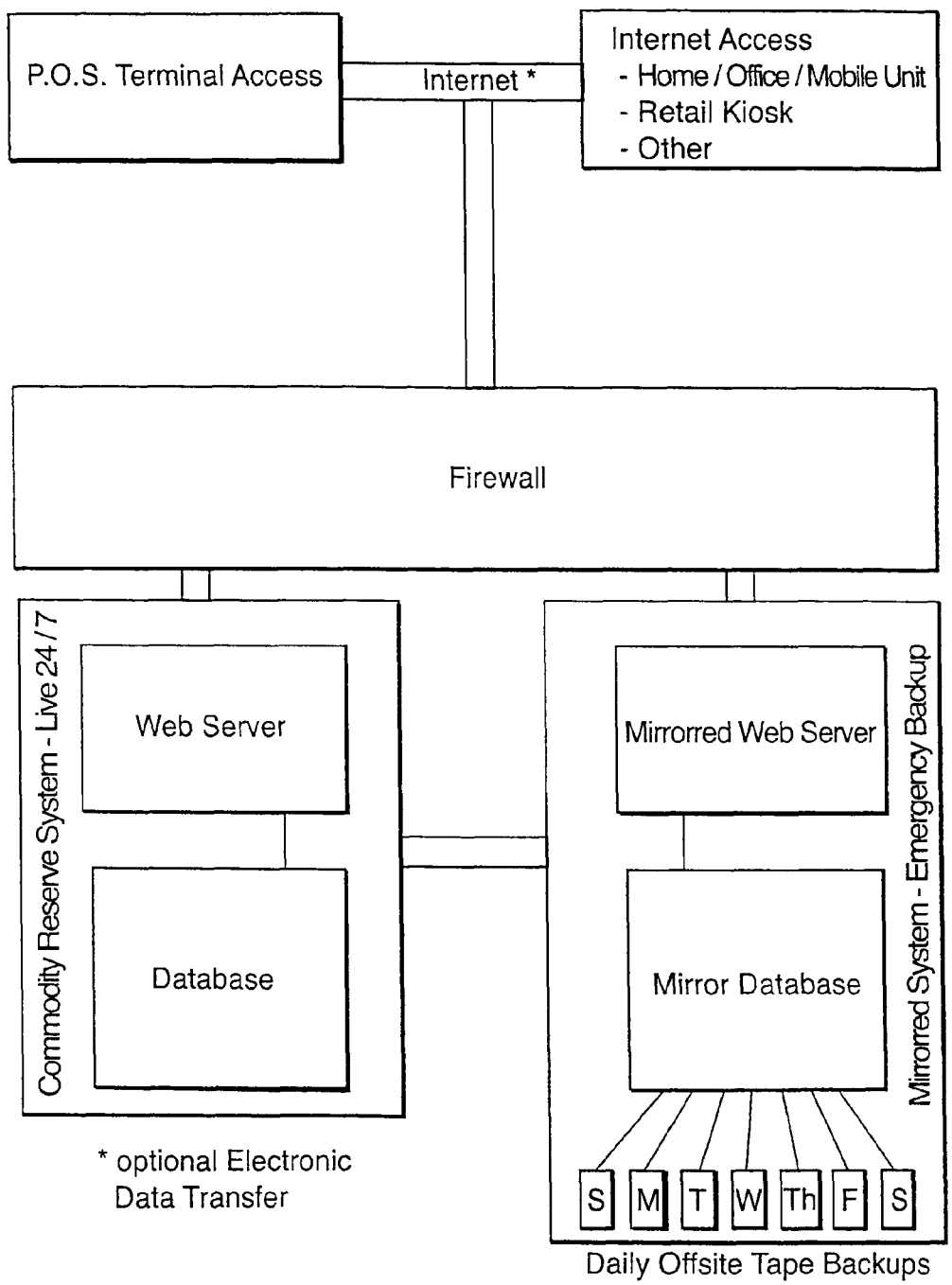
FIG. 1 is an overview of the system architecture using the Internet as a preferred means of connecting information and system components. Depicted are the major data flow routes, as begun from one of two points, the point of sale terminal or an Internet browser. Electronic Data Transfer, VPN's, or dial-up computer networks can be used as an alternative in areas without web capabilities. In this embodiment a mirrored system is housed at a location discrete from both the electronic quantity purchasing system, and daily offsite data backup is utilized. Remote access to any part or whole of the system must first be granted authorization via the security measures in place at the firewall.

Referring to FIG. 1 an overview of the system architecture using the Internet as a preferred means of connecting information and system components in one embodiment is shown. Depicted are the major data flow routes, as begun from one of two points, the point of sale terminal or an Internet browser. Electronic Data Transfer, VPN's, or dial-up computer networks can be used as an alternative in areas without web capabilities. In this embodiment a mirrored system is housed at a location discrete from both the electronic purchasing system, and daily offsite data backup is utilized. Remote access to any part or whole of the system must first be granted authorization via the security measures in place at the firewall.

The method may comprise maintaining a computer database system of commodity product information, identifying the quantity units in which quantities of commodity are transacted, identifying the unit price or value for each product for sale and displaying this value in the system catalog. It should be noted that, as used herein, the expressions "units" and "quantity units" do not necessarily refer to specific whole values, and may refer to any physical measure such as weight or volume including tonnage, gallons, liters, barrels, or bushels, or refer to another measure such as a monetary measure including dollars or euros, or may refer to any other desirable system for quantifying the account value for one or more commodities, and may be a mix of measurements.

Accounts are created for the user or potential user that can take place as part of a pre-registration process. In this way, the registration process can occur on-line or off-line. Each user is assigned a unique secure access code to transact online.

Designated actuation controls are used for instructing the system to instantly purchase the commodity at the posted price of the product. Designated actuation controls are also provided for instructing the system to instantly transfer online commodity to another user.

Optionally the system can brand each commodity for sale with corporate ID to promote the identity of the commodity seller, After a user decides to complete a transaction, transaction details are verified, financial data for automated payment for the online commodity are obtained and recorded, and system database is updated, instantly reflecting the transaction in the user's account history. The method includes the option of connecting the electronic quantity purchasing system directly to separate and distinct financial institutions for real-time credit approval before a purchase can take place. In this way, instant automated payment confirmation is carried out, as and when required.

Users are provided with a redemption means via a unique identifier, e.g. a bar-coded keytag or magnetic striped & bar coded card, and/or special point-of-sale communications system in order for users to redeem their pre-purchased quantities of commodity at retail locations in the future.

The system comprises at least one web server computer designed for serving a host of computer web browsers simultaneously and providing said browsers with the capability to interface with the system, where each browser can carry out a specified transaction of a specified commodity. The web server co-operates with a separate database computer, separated from the web server computer by a firewall. The database computer is accessible to the web computer to allow selective retrieval of commodity information which can include:

Product description

Quantity of product to be transacted.

Current posted purchase price of the goods or service (commodity) to be purchased.

The web server computer can include custom written interface software for transacting commodities in the system database computer by displaying, during a transaction or at any other time, the current price of the commodity, providing a designated user actuation control for instructing the system to instantly purchase a commodity at the posted price, continually updating the price, and continually updating all aspects of the system display as the user uses the interface to interact with the database.

The present invention resolves a complex administrative scheme that would otherwise arise in offering consumers and businesses a means of protecting against future price fluctuations of frequently purchased commodities. It also provides a simple and effective means of allowing purchasers to buy commodities at low bulk prices and then redeem, in whole or in part, at designated locations, at a later time.

Figure 2:
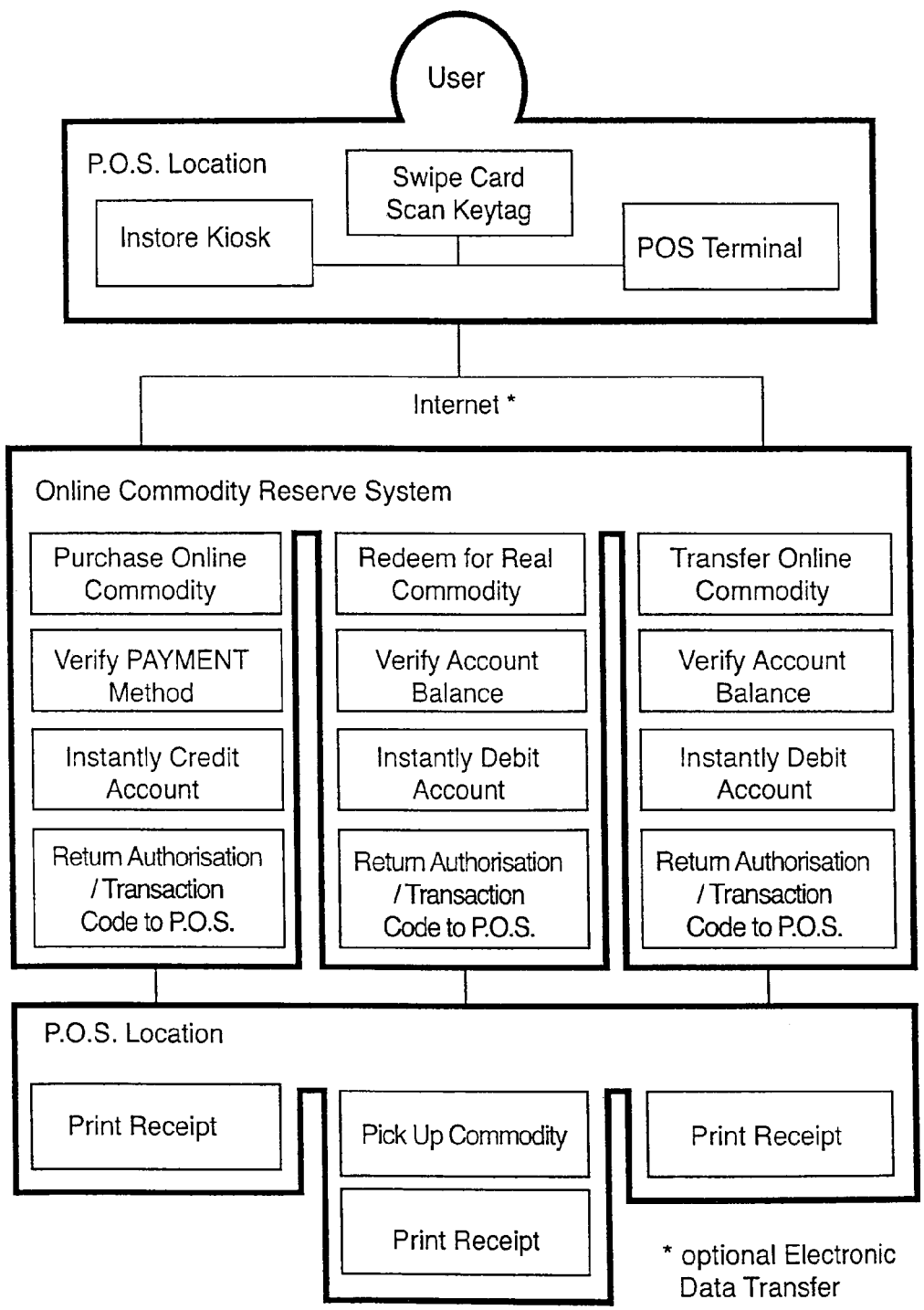
FIG. 2 is a conceptual map of the possible functions routing from the first data flow point, the point of sale terminal. A user will initiate communication using their personal access device (keytag/card). Again in this embodiment all communications between the point of sale terminal and the machines that make up the complement of the electronic quantity purchasing system are completed via the Internet. A receipt detailing the transaction executed is obtained from the point of sale terminal upon completion.
Figure 4:
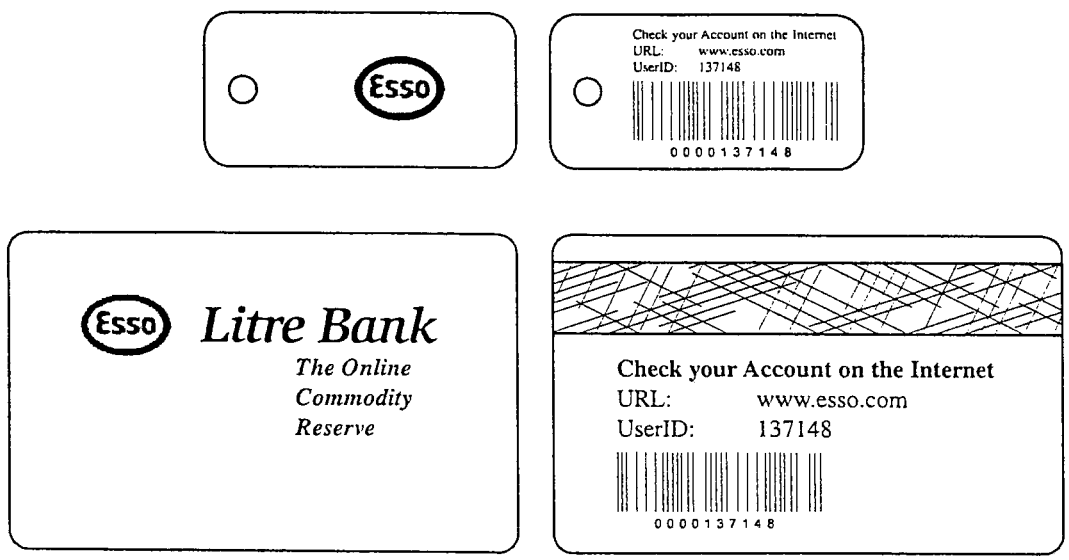
FIG. 4 is a graphic example of the personal access device (keytag/card) exercised by the user to activate communications with the system.

Referring to FIG. 2, communication with the system may be made by a user's personal access device (keytag/card) as depicted in FIG. 4. Again in this embodiment all communications between the point of sale terminal and the machines that make up the complement of the electronic quantity purchasing system are completed via the Internet. A receipt detailing the transaction executed is obtained from the point of sale terminal upon completion.

Figure 3:
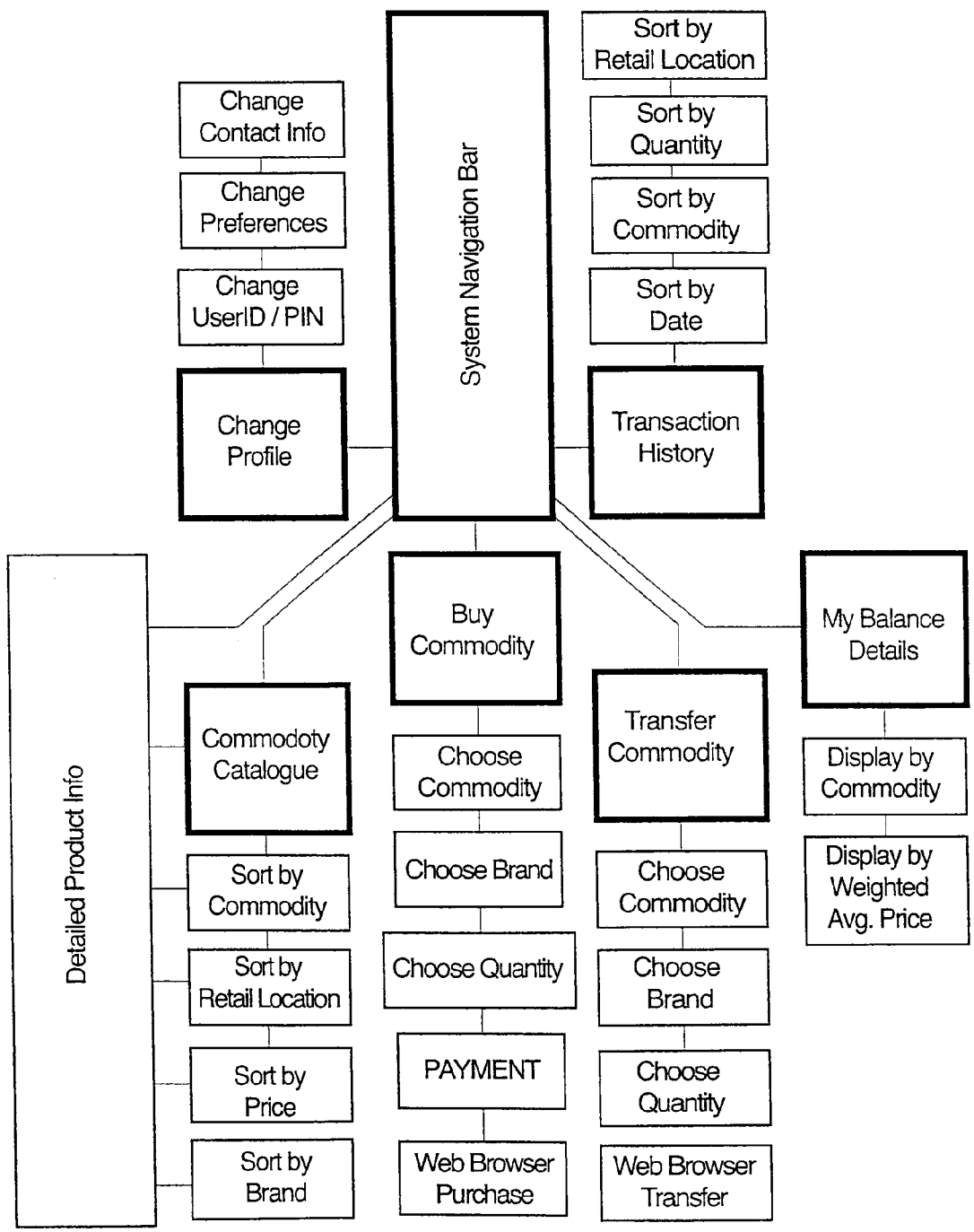
FIG. 3 is a conceptual map of the possible functions routing from the second, alternative or additional data flow point, an Internet browser. This method of access is location non-specific. The user will initiate communication using standard web browser software on a computer or other Internet-enabled device. Interfacing with the system follows a linear path in a drill-down model, where a system navigation bar contains the designated actuation controls for each functionality path.

Access can also be obtained by routing from an Internet browser as shown in FIG. 3. This method of access is location non-specific. The user will initiate communication using standard web browser software on a computer or other Internet-enabled device. Interfacing with the system follows a linear path in a drill-down model, where a system navigation bar contains the designated actuation controls for each functionality path.

On accessing the system, users will be able to perform some or all of the following functions as shown in FIGS. 5 to 11:

Go through a step by step demonstration of how the electronic quantity purchasing system works.

Create their own account with secure User ID and password protection.

Purchase discrete quantity units of commodity products using an approved payment method.

Redeem discrete quantities of the commodity within the balance available.

View the on-line catalog of commodities, products and prices.

Create an account for another user.

Transfer amounts of commodity to another user.

View the balance of the amounts of commodity in their account and review their transaction history.

View the weighted average unit purchase value of the commodity remaining in their account so that it may be compared at any time with the current market price. (e.g. motorists will want to know if the weighted average purchase price of the pre-paid gasoline gallons remaining in their account is higher or lower than current street pump price so that they may make an informed decision whether or not to redeem).

Modify all account contact information and access codes.

View and customize the system interface to reflect corporate identity

View and customize the system to intelligently reflect commodities or products available within the range of each user.

In addition to the above activities, the user will be provided with general information about the electronic quantity purchasing system, system security and privacy, and a customer help line.

In various forms of the present system, price zones features can be utilized. The price of a commodity often varies from region or territory in the country or within a state, for example. The reasons for this variance often are due to taxing or regulatory bodies such as states or municipalities, or a national government, as well as transportation or production costs. For instance, the cost or price of fuel can vary from one zone to another, the zones delineated by taxing bodies such as states or municipalities, and/or by governmental regulations on fuel composition based on region and season. As another example, one grain or lumber mill may have higher production costs than another so that the price of its output is higher than that of another mill.

Components of the price for fuel may vary from zone to zone due to a number of factors. Depending on the point of origin for the fuel or its base crude (as well as for ethanol component products), the refinery or the harbor factors into the price. Transportation costs, such as those due to pipelines, barges, tankers, truck or rail car transport, and other charges from source, to refinery or production plant, and to point of purchase, and shipping charges between these points, influence the price. Taxes and governmental fees, including state excise taxes, state inspection fees of both grade and service pumps, pollution or so-called gas guzzler taxes, coastal protection tax, and local/county excise taxes variably influence the price. The price is also based on point of purchase (retailer or service station) costs, often determined by supply and demand conditions but also factoring local business costs such as labor supply (wages and salaries and benefits), equipment, lease/rent, insurance, overhead, and state and local fees.

The system, accordingly, may be provided with a database or table that accounts for the various price components so that a price cost presented to a user of the system considers each of these components for a specific zone. The table is periodically updated, as necessary and/or convenient.

The system may utilize the price zone information in two manners. In a first form, the system allows the user to purchase fuel for use in a specific zone to which redemption from their account is restricted. In a second form, the system allows the user to purchase fuel based on a price in a specific zone, while allowing the user to redeem from their account in a different zone. In short, to enable the redemption to take place in a different zone, the system automatically converts the original purchase quantity into a quantity available for redemption in a different zone, using a conversion factor based on the unit price differential between the purchase zone and redeeming zone(s).

Figure 5:
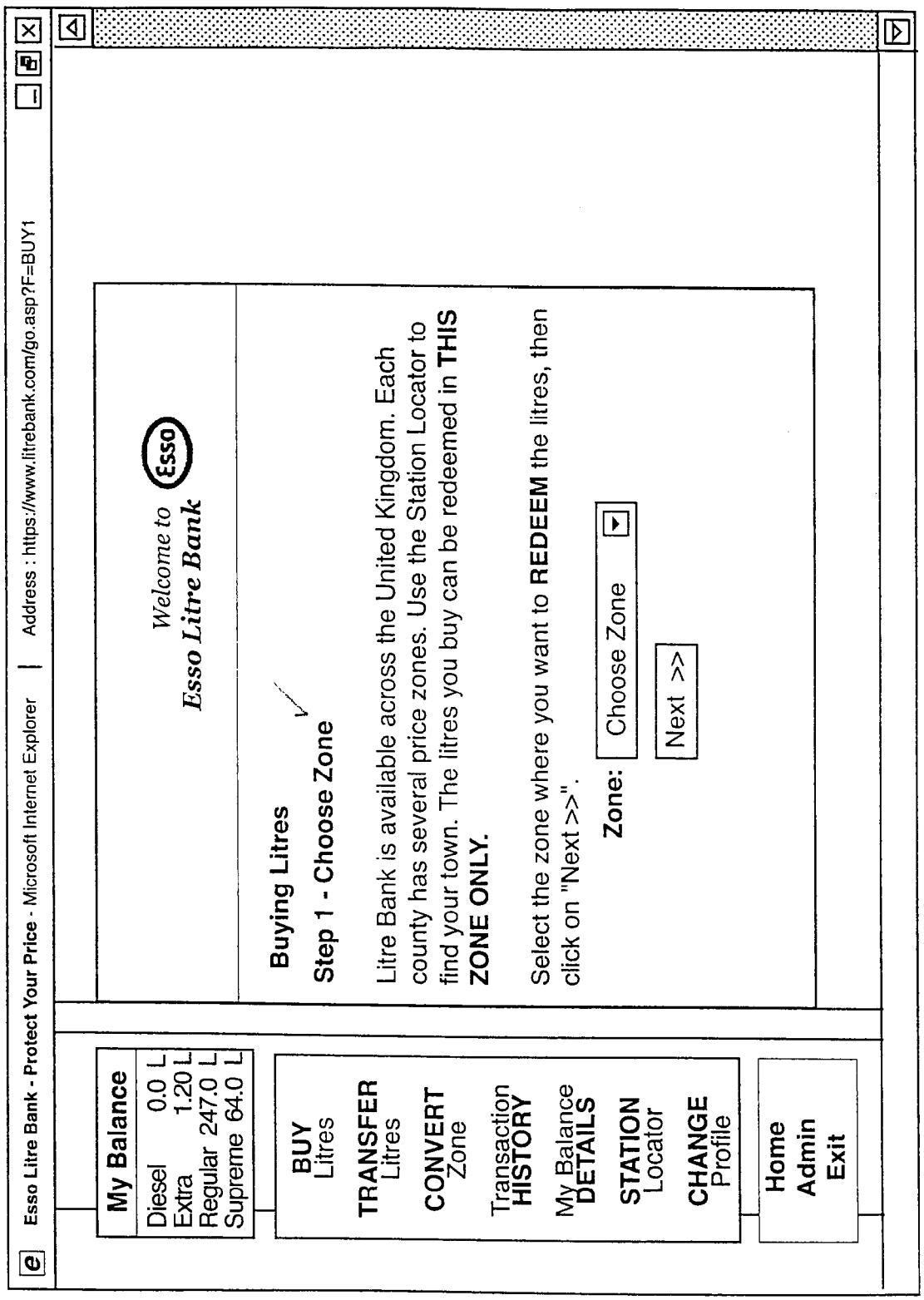
FIG. 5 is the display shown after actuating the control to purchase a commodity.
Figure 6:
FIG. 6 is the display shown after actuating the control to transfer a commodity to another user.
Figure 8:
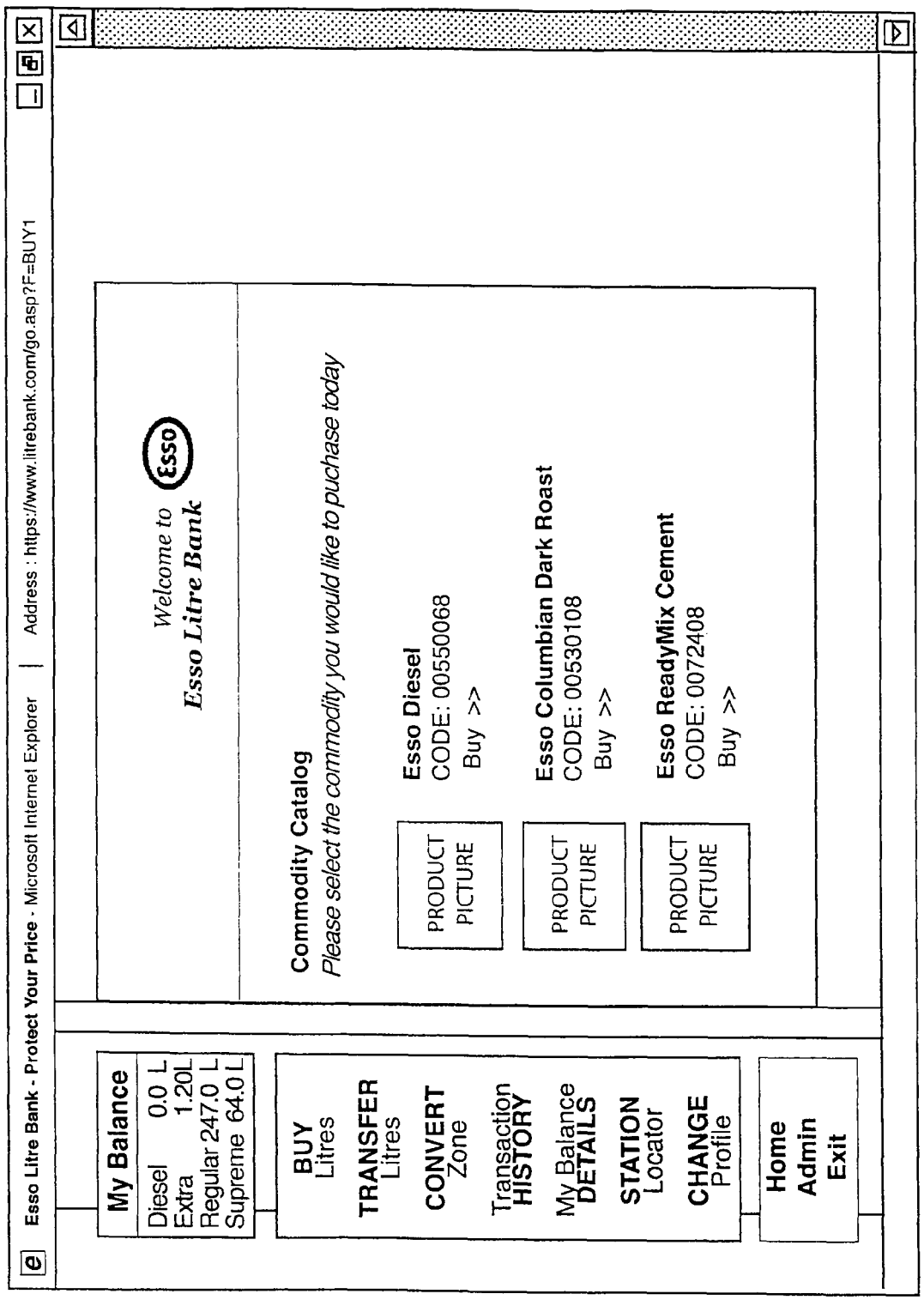
FIG. 8 is the display shown after actuating a control to view all of the commodities and products available in the system catalogue.
Figure 9:
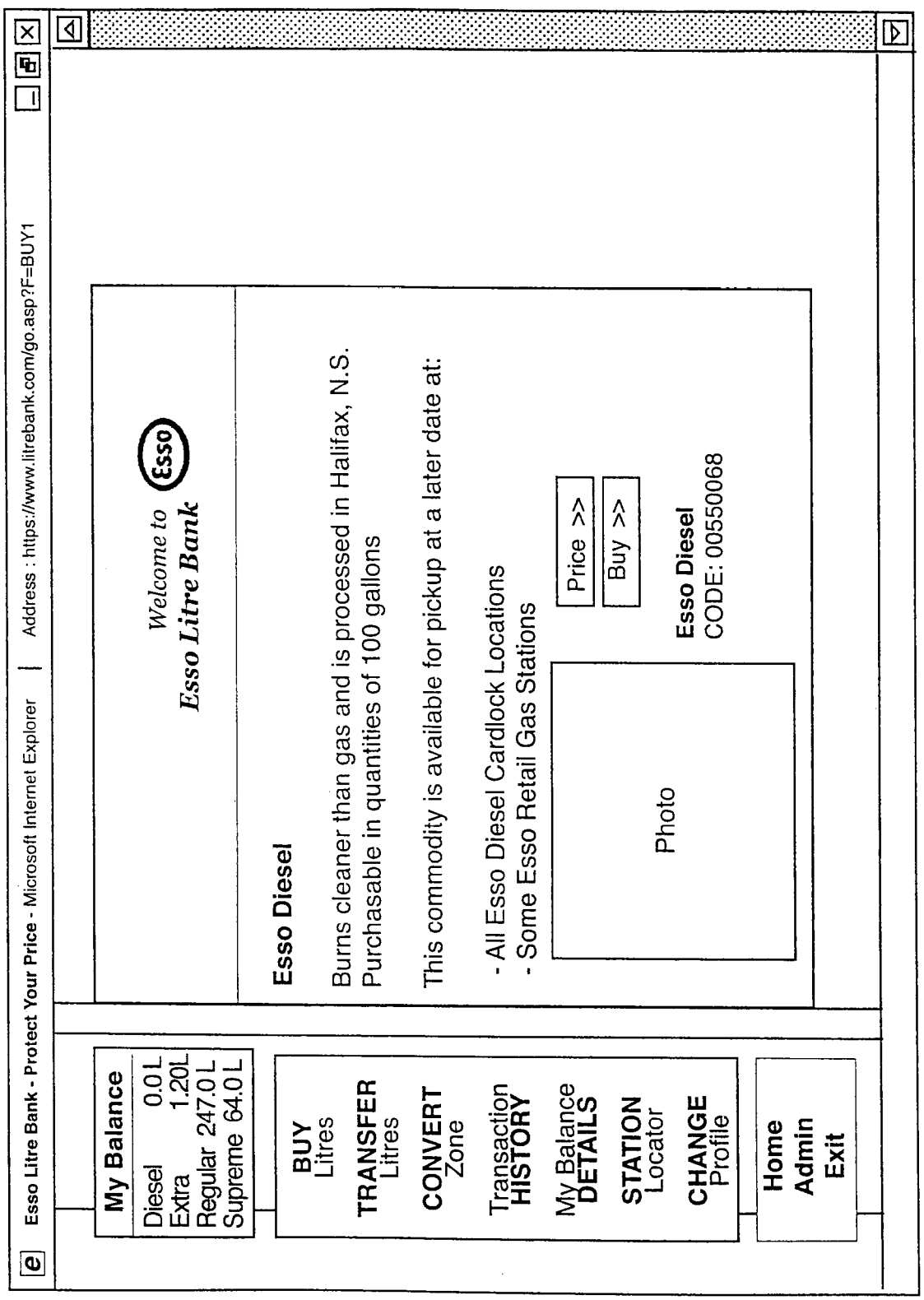
FIG. 9 is the display shown after actuating the control to view, in the most detail, the description, image, price and code numbers of a particular commodity or product.
Figure 10:
FIG. 10 is the display shown after actuating the control to modify contact info, mailing addresses or access codes on a user's account.

As shown in FIG. 5, a user may be prompted to select a zone (Choose Zone). Alternatively, the zone may be defaulted so that a user need not be concerned with this. For instance, the zone may use information derived from the user's IP address and ISP that indicates where the user is located, or the user may have previously input this information such as by providing a mailing address and/or zip code. Each price zone has a different unit price that can be locked-in at the time of purchase, that price including all the above-discussed components.

In the first form, the quantity purchased can be redeemed, at the locked-in price, only in the Price Zone chosen. In the second form, the user may convert all or part of their pre-paid purchases in the account to a different price zone. This may be done manually, via the system, or automatically by a user simply redeeming all or a portion of their balance in another zone, and the system automatically converts the purchase quantities to update their balance. A user may prefer the certainty of identifying and controlling any conversion which would be permitted by using the system such as in an online environment, or may prefer the ease of simply checking their balance at a subsequent point. In a form utilized by a user purchasing fuel for a nationwide fleet for instance, the system would first debit the account for fuel purchases for a specific zone in which a driver redeems and receives fuel, and the user provides rules for selecting which purchases, based on zone or grade or another basis, are then converted to compensate for further redemptions in a zone where there is an insufficient account balance.

As can be seen on the navigation in FIG. 5, a Convert Zone function is provided. The user may use the Convert Zone feature to convert part or all of the quantity in their pre-paid account to another price zone. Because each price zone has a different locked-in price, the user's account is adjusted up or down depending on the price differential between the price zones and the quantity converted.

FIG. 7 illustrates an example of a user's account by price zone. In this example, a user has purchased discrete quantities of Regular Gasoline in four different price zones, specifically Manitoba, New Brunswick, Ontario South West, and Yukon, each in Canada. The Convert Zone function permits the user to convert some or all of the 110 liters of Regular Gasoline in the New Brunswick Price Zone into liters in the Manitoba Price Zone. The user's account is adjusted up or down according to the unit price differential between the New Brunswick and Manitoba Price Zones and applied to the volume converted.

The Convert Zone feature is preferably incorporated throughout the system allowing a user easy access to this feature, as can be seen in FIGS. 6, 8, 9, and 11.

The following is presented as a further example of the Convert Zone feature. On a day of purchase the price of gas in price zone A is $3.00 a gallon while in Zone B the price is $2.00 a gallon. A Purchaser purchases 100 gallons in price zone B for a fleet of vehicles for $2.00/gallon. The purchase price is $200.00. Two days later a vehicle in the fleet needs to refuel in price zone A. Before the fuel can be dispensed, the purchaser may convert the unit/price ratio so that the amount of fuel to be dispensed can be recalculated to be in line with what was pre-purchased. By entering the system of the invention, and selecting the zone in which the purchase is to be converted for redemption, in this example from zone B to zone A, the system will authorize up to 66.67 gallons to be dispensed, as this is the quantity of fuel pre-paid for if the purchase was initially paid for in zone A. Because this is a pre-purchase system, there must always be a correlation between quantity and price paid that must be taken into consideration in the zone of redemption.

Alternatively, the system may automatically convert pre-purchased quantities, which allows for a user to avoid planning ahead or avoid even the necessity of recognizing they have changed zones. That is, another feature of the system is that the Zone Conversion function may automatically perform a zone conversion between zones if a user redeems in a different zone to the zone in which, or for which, the initial purchase was made. In the above example, a user who bought 100 gallons in zone A. If the user were to redeem the fuel purchase in zone B, the system would automatically convert the 100 gallons to 66.67 gallons and make 66.67 gallons available to that user for redemption in zone B, based on the components of price.

The system therefore:

a) Makes the Convert Zone function available to the user to perform manually in advance of a redemption.

or b) Automatically conducts the zone conversion function at the time or after the time the redemption has taken place.

Another feature of the system is that when the quantity is purchased by a user and the purchase price is locked-in or capped, the quantity purchased may form part or all of a quantity that is hedged using instruments traded on the futures and options exchanges such as the New York Mercantile (NYMEX) or the Chicago Board of Trade (CBOT). These exchanges typically require a minimum quantity to be hedged (e.g. 42,000 gallons of gasoline or heating oil). The system therefore aggregates one or more orders into a quantity that is able to be price protected using such instruments or derivatives as futures, options or swap contracts.

The value of these contracts is that the future price is protected for the quantity purchased if the spot market price rises higher than the contract strike price. The hedging aspect of the system therefore minimizes exposure to future adverse price fluctuations of a price-volatile commodity by fixing the future price for a predetermined quantity by establishing a hedging contract and permitting a price-lock or price-cap feature to be offered to its users.

This feature of the system may utilize, for instance, futures contracts or options contracts, or both. A futures contract is a firm commitment to make or accept delivery of a specified quantity of a commodity during a specific month in the future at a price agreed upon at the time the commitment is made. The buyer agrees to take delivery of the commodity. The seller agrees to make delivery. Only a small number of contracts traded each year result in delivery of the commodity. Instead, traders generally offset their futures positions before their contracts mature. A buyer will liquidate by selling the contract. A seller will liquidate by buying back the contract.

An options contract, or simply option, is a privilege sold by one party to another that offers the buyer the right, but not the obligation to buy (call) or sell (put) an underlying commodity futures contract at an agreed-upon price on a future specified date. The buyer pays a premium to the seller for the privilege.

There are two types of options: calls and puts. A call gives the holder of the options contract the right, but not the obligation to buy the underlying futures contract. Conversely, a put gives the holder the right but not the obligation to sell the underlying futures contract.

The price at which the underlying futures contract may be bought or sold is the exercise price, also called the strike price. An options contract affords the right to buy or sell for only a limited period of time; each options contract has an expiration date.

On the opposite side, a seller, or writer of an options contract incurs an obligation to perform, should an options contract be exercised by the purchaser. The writer of a call incurs an obligation to sell a futures contract and the writer of a put has an obligation to buy a futures contract.

In this aspect, the system permits a purchaser to purchase quantities of commodities, and permits the purchaser to sell at least a portion of the purchased quantities to another user or entity.

Although various preferred embodiments of the present invention have been described herein in detail, it will be appreciated by those skilled in the art, that variations may be made thereto without departing from the spirit of the invention or the scope of the appended claims.

What is claimed is:

1. A system, comprising:
    a database including information about at least one commodity including quantity units and a current time unit purchase price; and
    a web server computer for interacting with the database and also for interacting with at least one client computer configured to be used by a purchaser, the web server computer designed to allow the purchaser to:
        establish a bulk refillable account capable of having a balance in quantity units for the commodity;
        perform an electronic purchase transaction that results in the system recording financial data for payment for the commodity and obtaining payment approval from a financial institution, the purchase transaction comprising the purchase of a quantity of the commodity at a posted and locked-in current time unit purchase price particular to a certain purchase zone, the purchase transaction resulting in the purchased quantity being summed with the quantity account balance and thus an increase in the balance of quantity units of the commodity in the account; and
        identify a redemption zone different than the purchase zone, the redemption zone identification resulting in an automatic conversion of at least a portion of the balance of quantity units in the account into a different amount of quantity units available for redemption in the redemption zone, the system subtracting from the balance for any quantity units of the commodity that are redeemed.

2. The system of claim 1 wherein the redemption zone includes at least one retail location that allows redemption of at least a portion of the balance of quantity units in the account.

3. The system of claim 1 wherein the web server computer also is for interacting with a retail point of sale device to validate a unique identifier presented at a retail location and then authorize the redemption of at least a portion of the balance of quantity units in the account.

4. The system of claim 3 wherein the web server computer also is for interacting with a retail point of sale device at a plurality of the retail locations.

5. The system of claim 1 wherein the unique identifier is presented at the retail location by the purchaser or by one or more other authorized people.

6. The system of claim 1 wherein the commodity is fuel, and wherein the fuel is gasoline, diesel, or heating oil.

7. The system of claim 6 wherein the quantity units are measured in gallons.

8. The system of claim 1 wherein the purchase transaction also results in the system aggregating the purchased quantity with one or more other purchased quantities to form a larger total purchased quantity of the commodity that is capable of being price protected using one or more financial instruments tradeable on a financial exchange.

9. The system of claim 8 wherein the financial instruments are futures, options, or swap contracts.

10. The system of claim 8 wherein the financial exchange is the New York Mercantile (NYMEX) or the Chicago Board of Trade (CBOT).

11. A system, comprising:
    a database including information about at least one commodity including quantity units and a current time unit purchase price; and
    a web server computer for interacting with the database and also for interacting with at least one client computer configured to be used by a purchaser, the web server computer designed to allow the purchaser to:
        establish a bulk refillable account capable of having a balance in quantity units for the commodity;
        perform an electronic purchase transaction that results in the system recording financial data for payment for the commodity and obtaining payment approval from a financial institution, the purchase transaction comprising the purchase of a quantity of the commodity at a posted and locked-in current time unit purchase price particular to a certain purchase zone, the purchase transaction resulting in the purchased quantity being summed with the quantity account balance and thus an increase in the balance of quantity units of the commodity in the account; and
        redeem at least a portion of the quantity account balance in the purchase zone for a quantity of a physical commodity in a redemption zone different than the purchase zone, the system automatically converting the quantity of commodity redeemed and subtracting from the balance for any converted quantity units of the commodity that are redeemed.

12. The system of claim 11 wherein the redemption zone includes at least one retail location that allows redemption of at least a portion of the balance of quantity units in the account.

13. The system of claim 11 wherein the web server computer also is for interacting with a retail point of sale device to validate a unique identifier presented at a retail location and then authorize the redemption of at least a portion of the balance of quantity units in the account.

14. The system of claim 13 wherein the web server computer also is for interacting with a retail point of sale device at a plurality of the retail locations.

15. The system of claim 11 wherein the unique identifier is presented at the retail location by the purchaser or by one or more other authorized people.

16. The system of claim 11 wherein the commodity is fuel, and wherein the fuel is gasoline, diesel, or heating oil.

17. The system of claim 16 wherein the quantity units are measured in gallons.

18. The system of claim 11 wherein the purchase transaction also results in the system aggregating the purchased quantity with one or more other purchased quantities to form a larger total purchased quantity of the commodity that is capable of being price protected using one or more financial instruments tradeable on a financial exchange.

19. The system of claim 18 wherein the financial instruments are futures, options, or swap contracts.

20. The system of claim 18 wherein the financial exchange is the New York Mercantile (NYMEX) or the Chicago Board of Trade (CBOT).

\* \* \* \* \*